(12) United States Patent
VerNooy

(10) Patent No.: US 6,379,640 B1
(45) Date of Patent: Apr. 30, 2002

(54) PROCESS FOR THE DECOMPOSITION OF NITROUS OXIDE

(75) Inventor: Paul Douglas VerNooy, Media, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/515,006

(22) Filed: Feb. 29, 2000

Related U.S. Application Data

(60) Provisional application No. 60/122,933, filed on Mar. 5, 1999.

(51) Int. Cl.[7] ............................................. C01B 21/00
(52) U.S. Cl. ..................... 423/239.1; 423/235; 502/338
(58) Field of Search .................. 423/239.1, 351, 423/579, 235; 502/325, 326, 333, 334, 335, 336, 338, 349, 337, 339, 324, 303, 304, 217, 208

(56) References Cited

U.S. PATENT DOCUMENTS

| | | | | |
|---|---|---|---|---|
| 3,907,714 A | * | 9/1975 | Compton et al. | 252/462 |
| 4,851,381 A | * | 7/1989 | Hums | 502/209 |
| 5,314,673 A | * | 5/1994 | Anseth et al. | 423/239.1 |
| 5,520,895 A | * | 5/1996 | Sharma et al. | 423/239.2 |

* cited by examiner

*Primary Examiner*—Steven P. Griffin
*Assistant Examiner*—Edward M. Johnson

(57) ABSTRACT

This invention relates to a process for the conversion of nitrous oxide ($N_2O$) to nitrogen and oxygen using a supported catalyst comprising iron and, optionally, certain other metals and to a novel catalyst composition.

23 Claims, No Drawings

PROCESS FOR THE DECOMPOSITION OF NITROUS OXIDE

This application claims priority of Provisional No. 60/122,933, filed on Mar. 5, 1999.

FIELD OF THE INVENTION

This invention relates to a process for the conversion of nitrous oxide ($N_2O$) to nitrogen and oxygen in the presence of a supported metal-containing catalyst. The invention also includes a novel catalyst composition and a method for making the catalyst composition.

BACKGROUND OF THE INVENTION

Nitrous oxide is a greenhouse and ozone-depleting gas, and is a by-product of adipic and nitric acid manufacturing.

U.S. Pat. No. 5,705,136 discloses a process for the decomposition of nitrogen oxides to nitrogen and oxygen comprising contacting the nitrogen oxides with a mixed oxide catalyst wherein the catalyst comprises a first metal oxide selected from the oxides of Mn, Fe, Co, Ni, Cu, Zn and mixtures thereof on a metal oxide support consisting essentially of MgO, CaO, ZnO, $TiO_2$, $MoO_3$—CoO—$Al_2O_3$, ZnO—$Al_2O_3$, $TiO_2$—MgO, $TiO_2$—$Al_2O_3$, $TiO_2$—ZnO, MgO—CuO and MgO—NiO or mixtures thereof.

U.S. Pat. No. 5,314,673 discloses a process for the conversion of $N_2O$ to nitrogen and oxygen which comprises contacting the $N_2O$ with a catalyst consisting essentially of nickel oxide and cobalt oxide on a zirconia substrate.

There is a need for catalysts which can decompose $N_2O$ into $N_2$ and $O_2$, and have a minimal environmental impact of their own. That is, they should contain readily-available and non-toxic materials, be simple to make, have a long lifetime, and not pose disposal problems. The catalysts should also be hard and porous.

SUMMARY OF THE INVENTION

This invention provides a process for the conversion of nitrous oxide ($N_2O$)) into nitrogen ($N_2$) and oxygen ($O_2$) comprising contacting $N_2O$ with a metal-containing catalyst supported on zirconia under conditions effective to decompose the $N_2O$ to $N_2$ and $O_2$, wherein the catalyst comprises iron and optionally at least one metal selected from the group consisting of cobalt, nickel, rhodium, palladium, iridium, platinum, manganese, lanthanum and cerium and the catalyst is prepared by the steps of:

(a) preparing a paste comprising contacting zirconium hydroxide with a solution of an iron salt and a zirconium salt, optionally in the presence of binders and lubricants;

(b) forming a shaped particle from the step (a) paste;

(c) drying the step (b) shaped particle;

(d) calcining the dried step (c) shaped particle at a temperature of at least 400° C.; and (e) optionally adding at least one metal selected from the group consisting of cobalt, nickel, rhodium, palladium, iridium, platinum, manganese, lanthanum and cerium, to step (a) or to the calcined step (d) shaped particle.

In another embodiment, this invention provides a catalyst composition useful in a process for the decomposition of nitrous oxide, wherein the composition comprises a metal-containing catalyst supported on a zirconia shaped particle, wherein the metal comprises iron and optionally at least one metal selected from the group consisting of cobalt, nickel, rhodium, palladium, iridium, platinum, manganese, lanthanum and cerium, wherein the catalyst is prepared by the steps of:

(a) preparing a paste comprising contacting zirconium hydroxide with a solution of an iron salt and a zirconium salt, optionally in the presence of binders and lubricants;

(b) forming a shaped particle from the step (a) paste;

(c) drying the step (b) shaped particle;

(d) calcining the dried step (c) shaped particle at a temperature of at least 400° C.; and (e) optionally adding at least one metal selected from the group consisting of cobalt, nickel, rhodium, palladium, iridium, platinum, manganese, lanthanum and cerium, to step (a) or to the calcined step (d) shaped particle; and wherein the crush strength of the calcined shaped particle is at least 22.2 newtons.

DETAILED DESCRIPTION

Zirconium hydroxide (i.e., "$Zr(OH)_4$", sometimes referred to as zirconium oxyhydroxide or hydrated zirconia) powder is dried before use at about 50° C. to 150° C., preferably at about 100° C. The zirconium hydroxide can be doped with various elements such as Ca, Mg, Si, and La to help maintain a high surface area upon calcination.

The iron and zirconium salts can be chosen from a wide variety of salts, which readily decompose upon calcination to produce iron and zirconium oxides, such as acetates, carbonates, citrates, nitrates, oxalates and chlorides. Surprisingly, even chlorides may be used, although the other salts are preferred. Sulfates and phosphates can also be included in small amounts, as these anions help maintain a high surface area upon calcination. In addition, other components, such as binders and lubricants, can be added to the paste to aid in the shaping process, e.g., extrusion., and provide green strength. The iron in the iron salts can be in either the +2 or +3 oxidation states, with the +3 oxidation state being preferred. The minimum iron content is 0.5% Fe or a minimum iron nitrate content of the pepping solution is 5%. The preferred iron concentration in the catalyst is 1.5% to 7%, with a most preferred iron concentration of about 3% to 4%.

The process of this invention also includes the use of one or more solvents selected from conventional liquid solvents which are inert in the context of the process of the present invention and easily removed by drying (evaporation) and/or by combustion during calcination. These solvents include water; alcohols, such as methanol, ethanol and propanol; ketones, such as acetone and 2-butanone; aldehydes, such as propanol and butanal; and aromatic solvents such as toluene and benzene. Water is the preferred solvent.

The amount of solvent used in preparing the paste of step (a) is an amount that provides a consistency which allows for a shaped particle to be mechanically formed out of the paste, but not so fluid as to fail to hold its form or shape or become sticky and agglomerate with other particles. Typically, the total amount of solvent in the paste is from about 10% to about 30% by weight of the paste.

The paste of the present process may also contain rheology control agents and pore forming agents. Rheology control agents include starches, sugars, glycols, polyols, powdered organic polymers, graphite, stearic acid and its esters. Pore forming agents include graphite, polypropylene or other organic polymer powders, activated carbon, charcoal, starches and cellulose flour. The rheology control agents and pore forming agents (some materials may perform both functions) are well known to those of ordinary skill in the art and are used as necessary to obtain the desired viscosity of the paste or porosity of the formed particle, as the case may be. Typically, any of these may be present in the amount of from about 0.5% to about 20% by weight, preferably, from about 1% to about 10% by weight of the paste.

A formed or shaped particle is then prepared from the paste. Extrusion is the preferred forming technique. The formed particle may have a variety of cross sections such as cylinders, trilobes, and star shaped. The formed particles are air dried under conditions sufficient to form a particle that is not malleable (or soft) or friable. The dried formed particles are then calcined in air or in inert gases such as nitrogen or argon or mixtures thereof at a temperature of from about 400° C. to about 650° C. The result is a surprisingly hard and porous iron-zirconia formed particle. The crush strength of the shaped particles is at least about 22.2 newtons (5 pounds).

The rheology control agents and pore forming agents incorporated in the paste are removed from the finished shaped particle by a combination of volatilization and combustion during the final steps of drying and calcination of the shaped particle.

In one embodiment of this invention, catalytic metals for the decomposition of nitrous oxide may be incorporated into the step (a) paste or preferably, impregnated on the calcined step (d) shaped particle. At least one metal is selected from the group consisting of cobalt, nickel, rhodium, palladium, iridium, platinum, manganese, lanthanum and cerium. Suitable sources of catalytically active components include both organic and inorganic compounds. Inorganic compounds are preferred for impregnation of the iron-zirconia shaped particle. These compounds include; $Co(NO_3)_2.6H_2O$, $Ni(NO_3)_2.6H_2O$, $Rh(NO_3)_3$, $Na_2PdCl_4$, $IrCl_3$, $H_2PtCl_6$, $Pd(NH_3)_4Cl_2$, $Mn(NO_3)_2$, $La(NO_3)_3.6H_2O$ and $Ce(NO_3)_3.6H_2O$.

The catalytic metals are present in the amount of from about 0.1 weight percent to about 10 weight percent. A preferred catalyst composition contains nickel and cobalt on the iron-zirconia shaped particle. The ratio of nickel to cobalt in the catalyst is from about 0.5:1 to about 3:1.

Nitrous oxide is contacted with a catalyst of this invention. The nitrous oxide may be diluted with other gaseous components such as nitrogen, oxygen, argon and helium. A typical feed gas from an adipic acid plant which uses nitric acid as the oxidant contains about 10 volume % nitrous oxide; however, higher or lower feed rates are practical both for nitrous oxide produced in adipic acid plants and for other nitrous oxide sources, such as produced during the manufacture of nitric acid. Typical flow rates for nitrous oxide from an adipic acid plant may vary from about 30,000 $hr^{-1}$ to about 40,000 $hr^{-1}$. Again, as is true for the feed gas composition, higher or lower space velocities can be used. The reaction temperature depends on a number of factors such as preheat temperature, nitrous oxide concentration, catalyst composition, etc. The present invention is not dependent on reaction pressure.

Since, in the manufacture of adipic acid by the nitric acid oxidation of a mixture of cyclohexanol/cyclohexanone, nitrous oxide is produced as a by-product, the present invention provides a convenient method of decomposing the by-product nitrous oxide. The method involves contacting the nitrous oxide with a catalyst composition of this invention.

EXAMPLES

The crush strengths were tested with an Imada digital force gauge, model DPS-44R mounted on the SV1 lever-operated stand. A piece of calcined extrudate (>⅛" (3.2 mm) in length) is put perpendicular to the ⅛" (3.2 mm) wide jaws, and increasing force is applied until the extrudate is crushed. The peak load is recorded. The reported average is based on 51 trials.

Example 1

$Fe(NO_3)_3.9H_2O$ (52.7 g) was dissolved in zirconyl nitrate solution (71.8 g, "20% $ZrO_2$") and $H_2O$ (19.3 g). Zirconium hydroxide (average particle size 15 $\mu$, used as received, 254.6 g) was dry mixed with methylcellulose (7.5 g). The solution was mixed with the powder to form a paste. The paste was extruded into ⅛" (3.2 mm) trilobes using a Bonnot 1" (2.54 cm) extruder. After air drying, the extrudates were heated slowly to 500° C. and held at that temperature for 4 hours to form catalyst extrudate. The catalyst extrudates, which contained 3.44% Fe, had an average crush strength of 9.9 pounds (44 N).

Catalyst extrudates (10 mL), broken into ⅛" (3.2 mm) long pieces, were loaded into a tubular reactor and heated to 650° C. under flowing 10% $N_2O$/90% $N_2$ (3.0 L/min). The fresh catalyst decomposed 98.1% of the $N_2O$. The catalyst was then removed from the reactor and heated at 800° C. for 2 hours in air to simulate catalyst aging and reactor exotherms. Upon retesting at 650° C., the aged catalyst decomposed 94.2% of the $N_2O$.

A fresh sample of catalyst extrudate was treated with a solution of cobalt and nickel nitrate to achieve a loading of 1.2% Co and 1.2% Ni. Upon testing at 650° C., 100% of the $N_2O$ was decomposed. This catalyst was then aged at 800° C. for 2 hours in air and retested. Again it decomposed 100% of the $N_2O$. The catalyst was then aged a second time at 800° C. for 2 additional hours, and retested. Now the catalyst decomposed 95.6% of the $N_2O$.

Example 2

$Fe(NO_3)_3.9H_2O$ (23.5 g) was dissolved in zirconyl nitrate solution (74.9 g, "20% $ZrO_2$") and $H_2O$ (51.7 g). Zirconium hydroxide (average particle size 15 $\mu$, used as received, 256.6 g) was dry mixed with 7.6 g methylcellulose. The solution was mixed with the powder to form a paste. The paste was split into two batches. Both batches were extruded into ⅛" (3.2 mm) trilobes using a Bonnot 1" (2.54 cm) extruder. The first batch was extruded normally. The second batch was extruded directly into liquid nitrogen. After several minutes, the liquid nitrogen was decanted. Both batches were then air dried, and calcined by heating slowly to 500° C. and holding at that temperature for 4 hours to form catalyst extrudates, which contained 1.50% Fe. The first batch of catalyst extrudates had an average crush strength of 10.0 pounds (44.5 newtons), and the second batch's crush strength was 9.2 pounds (41 newtons).

Catalyst extrudates (10 mL) from the first batch, broken into ⅛" (3.2 mm) long pieces, were loaded into a tubular reactor and heated to 650° C. under flowing 10% $N_2O$/90% $N_2$ (3.0 L/min). The fresh catalyst decomposed 96.0% of the $N_2O$. The catalyst was then removed from the reactor and heated at 800° C. for 2 hours in air to simulate catalyst aging and reactor exotherms. Upon retesting at 650° C., the aged catalyst decomposed 95.5% of the $N_2O$.

Catalyst extrudates (10 mL) from the second batch, broken into ⅛" (3.2 mm) long pieces, were loaded into a tubular reactor and heated to 650° C. under flowing 10% $N_2O$ in $N_2$ (3.0 L/min). The fresh catalyst decomposed 91.0% of the $N_2O$. The catalyst was then removed from the reactor and heated at 800° C. for 2 hours in air to simulate catalyst aging and reactor exotherms. Upon retesting at 650° C., the aged catalyst decomposed 100% of the $N_2O$. Thus the aging treatment at 800° C. actually improved the activity of those catalysts extruded into liquid nitrogen.

Example 3

$FeCl_3$ (19.3 g) was dissolved in zirconyl nitrate solution (65.2 g, "20% $ZrO_2$") and $H_2O$ (45.4 g). Zirconium hydroxide (average particle size 15 $\mu$, used as received, 255.6 g) was dry mixed with methylcellulose (7.5 g). The solution was mixed with the powder to form a paste. The paste was extruded into ⅛" (3.2 mm) trilobes using a Bonnot 1" (2.54 cm) extruder. After air drying, the extrudates were heated slowly to 500° C. and held at that temperature for 4 hours to form catalyst extrudates. The catalyst extrudates, which contained 2.65% Fe, had an average crush strength of 5.2 pounds (23 N).

Catalyst extrudates (10 mL), broken into ⅛" (3.2 mm) long pieces, were loaded into a tubular reactor and heated to 650° C. under flowing 10% $N_2O$/90% $N_2$ (3.0 L/min). The fresh catalyst decomposed 90.0% of the $N_2O$. The catalyst was then removed from the reactor and heated at 800° C. for 2 hours in air to simulate catalyst aging and reactor exotherms. Upon retesting at 650° C., the aged catalyst decomposed 91.2% of the $N_2O$.

Example 4

Instead of adding the Co and Ni as a post treatment, their salts can be added to the iron and zirconium solution.

$Fe(NO_3)_3.9H_2O$ (56.3 g), $Ni(NO_3)_2.6H_2O$ (7.7 g), and $Co(NO_3)_2.6H_2O$ (7.8 g) were dissolved in zirconyl nitrate solution (76.9 g, "20% $ZrO_2$") and $H_2O$ (5.4 g). Zirconium hydroxide (average particle size 15$\mu$, used as received, 256.2 g) was dry mixed with methylcellulose (7.5 g). The solution was mixed with the powder to form a paste. The paste was extruded into ⅛" (3.2 mm) trilobes using a Bonnot 1" (2.54 cm) extruder. After air drying, the extrudates were heated slowly to 500° C. and held at that temperature for 4 hours to form catalyst extrudates. The catalyst extrudates, which contained 3.04% Fe, 0.73% Co, and 0.69% Ni, had an average crush strength of 12.6 pounds (56.0 N).

Catalyst extrudates (10 mL), broken into ⅛" (3.2 mm) long pieces, were loaded into a tubular reactor and heated to 650° C. under flowing 10% $N_2O$/90% $N_2$ (3.0 L/min). The fresh catalyst decomposed 98.2% of the $N_2O$. The catalyst was then removed from the reactor and heated at 800° C. for 2 hours in air to simulate catalyst aging and reactor exotherms. Upon retesting at 650° C., the aged catalyst decomposed 86.6% of the $N_2O$.

Example 5

This example shows how the addition of $Fe(NO_3)_3.9H_2O$ to the peptizing solution greatly increases the strength of the resulting extrudates. However, an iron salt solution containing no zirconium salts will produce a very weak catalyst.

The pure zirconia catalyst was made by first mixing zirconyl nitrate solution (95.7 g, "20% $ZrO_2$") with water (63.7 g) to make a "12% $ZrO_2$" solution. This solution was added to a mixture of $Zr(OH)_4$ (average particle size 15 $\mu$, used as received, 252.7 g) and methylcellulose (7.6 g) to form a paste. The paste was extruded into cylinders, air dried, and fired 4 hours at 500° C. to form catalyst extrudates. The resulting catalyst had an average crush strength of 3.9±0.9 pounds (17 N).

The iron-containing zirconia was made by first mixing $Fe(NO_3)_3.9H_2O$ (13.3 g), zirconyl nitrate solution (94.5 g, "20% $ZrO_2$"), and water (49.7 g) to also make a "12% $ZrO_2$" solution. This solution was added to a mixture of $Zr(OH)_4$ (average particle size 15 $\mu$, used as received, 253.1 g) and methylcellulose (7.6 g) to form a paste. The paste was extruded into ⅛" (3.2 mm) cylinders, air dried, and fired 4 hours at 500° C. to form catalyst extrudates, just as with the pure zirconia catalyst. The resulting catalyst, which contained 0.9% Fe, had an average crush strength of 12.4±1.8 pounds (55.2 N).

If the zirconium nitrate is omitted, a weak catalyst results. $Fe(NO_3)_3.9H_2O$ (65.8 g), 70% $HNO_3$ (9.2 g), and water (54.6 g) were mixed to form a "10% $Fe_2O_3$" solution. The solution was saturated with $Fe(NO_3)_3.9H_2O$. This solution was added to $Zr(OH)_4$ (average particle size 15 $\mu$, used as received, 259.2 g) and methylcellulose (8.0 g) to form a paste. The paste was extruded into ⅛" (3.2 mm) cylinders, air dried, and fired 4 hours at 500° C., just as with the pure zirconia catalyst. The resulting catalyst had no strength, turning to dust when handled.

Example 6

$Fe(NO_3)_3.9H_2O$ (37.8 g) was dissolved in zirconyl nitrate solution (51.5 g, "20% $ZrO_2$") and $H_2O$ (5.3 g). Silica-doped (3.5% $SiO_2$ on a $ZrO_2$ basis) zirconium hydroxide (150.4 g, average particle size 15 $\mu$, used as received) was dry mixed with methylcellulose (4.6 g). The solution was mixed with the powder to form a paste. The paste was extruded into ⅛" (3.2 mm) cylinders using a Bonnot 1" (2.54 cm) extruder. After air drying, the extrudates were heated slowly to 500° C. and held at that temperature for 4 hours to form catalyst extrudates. The catalyst extrudates, which contained 3.68% Fe and 1.2% Si, had an average crush strength of 12.4 pounds (55.2 newtons).

Catalyst extrudates (10 mL), broken into ⅛" (3.2 mm) long pieces, were loaded into a tubular reactor and heated to 650° C. under flowing 10% $N_2O$ in $N_2$ (3.0 L/min). The fresh catalyst decomposed 98.0% of the $N_2O$. The catalyst was then removed from the reactor and heated at 800° C. for 2 hours in air to simulate catalyst aging and reactor exotherms. Upon retesting at 650° C., the aged catalyst decomposed 85.0% of the $N_2O$.

Example 7

$Fe(NO_3)_3.9H_2O$ (556.5 g), sucrose (59.6 g), and polyethylene glycol (19.4 g, 400 g/mole average molecular weight) were dissolved in zirconyl nitrate solution (1030.6 g, "20% $ZrO_2$"). 15 $\mu$ lanthana-doped zirconium hydroxide (1451.7 g) and 1 $\mu$ (844.2 g) lanthana-doped zirconium hydroxide (7% $La_2O_3$ on $ZrO_2$ basis, dried in vacuum at 80° C.) were dry mixed with hydroxyethylcellulose (68.9 g). The solution was combined with the powder to form a paste and kneaded in a ¾ gallon (2.84 L) Readco double-sigma blade mixer for 102 minutes. The paste was extruded into ⅛" (3.2 mm) trilobes using a Bonnot 1" (2.54 cm) extruder. After air drying, the extrudates were heated slowly to 500° C. and held at that temperature for 4 hours. The extrudates, which contained 3.30% Fe, had an average crush strength of >48.6 pounds (>216 newtons). The limit of the force gauge used for the measurement is 48.6 pounds.

Catalyst extrudates (10 mL), broken into ⅛" (3.2 mm) long pieces, were loaded into a tubular reactor and heated to 650° C. under flowing 10% $N_2O$ in $N_2$ (3.0 L/min). The fresh catalyst decomposed 97.0% of the $N_2O$. The catalyst was then removed from the reactor and heated at 800° C. for 2 hours in air to simulate catalyst aging and reactor exotherms. Upon retesting at 650° C., the aged catalyst decomposed 77.0% of the $N_2O$.

Example 8

Fe(NO$_3$)$_3$.9H$_2$O (90.3 g) was dissolved in zirconyl nitrate (45.0 g) solution ("20% ZrO$_2$") and water (33.3 g). 15 μ lanthana-doped zirconium hydroxide (190.4 g, 7% La$_2$O$_3$ on ZrO$_2$ basis, dried in vacuum at 75° C.) was dry mixed with 8.7 g hydroxyethylcellulose. The solution was mixed with the powder to form a paste. The paste was extruded into ⅛" (3.2 mm) trilobes using a Bonnot 1" (2.54 cm) extruder. After air drying, the extrudates were ramped slowly to 500° C. and held at that temperature for 4 hours. The extrudates, which contained 7.13% Fe, had an average crush strength of 19.2 pounds (85.4 newtons).

10 cc of extrudates, broken into ⅛" (3.2 mm) long pieces, were loaded into a tubular reactor and heated to 650° C. under flowing 10% N$_2$O in N$_2$ (3.0 l/min). The fresh catalyst decomposed 94.0% of the N$_2$O. The catalyst was then removed from the reactor and heated at 800° C. for 2 hours in air to simulate catalyst aging and reactor exotherms. Upon retesting at 650° C., the aged catalyst decomposed 97.0% of the N$_2$O.

Example 9

Ammonium ferric citrate (42.0 g) and ammonium sulfate (5.9 g) were dissolved in ammonium zirconium carbonate solution (85.4 g, "20% ZrO$_2$") and water (26.2 g). Zirconium hydroxide (average particle size 15 μ, dried in vacuum at 75° C., 176.6 g) was dry mixed with 9.6 g hydroxyethylcellulose. The solution was mixed with the powder to form a paste. The paste was extruded into ⅛" (3.2 mm) trilobes using a Bonnot 1" (2.54 cm) extruder. After air drying, the extrudates were ramped slowly to 500° C. and held at that temperature for 4 hours. The extrudates, which contained 3.26% Fe and 0.81% S, had an average crush strength of 21.7 pounds (96.5 newtons).

10 cc of extrudates, broken into ⅛" (3.2 mm) long pieces, were loaded into a tubular reactor and heated to 650° C. under flowing 10% N$_2$O in N$_2$ (3.0 l/min). The fresh catalyst decomposed 84.0% of the N$_2$O. The catalyst was then removed from the reactor and heated at 800° C. for 2 hours in air to simulate catalyst aging and reactor exotherms. Upon retesting at 650° C., the aged catalyst decomposed 80% of the N$_2$O.

Comparative Example A

Examples A and B show that other transition metals can be substituted for iron, but the resulting catalysts are not strong or robust.

Cu(NO$_3$)$_2$.2.5H$_2$O (36.5 g) was dissolved in zirconyl nitrate solution (98.2 g, "20% ZrO$_2$"), and water (26.6 g). This solution was added to a mixture of Zr(OH)$_4$ (average particle size 15 μ, used as received, 255.1 g) and methylcellulose (7.6 g) to form a paste. The paste was extruded into ⅛" (3.2 mm) trilobes using a Bonnot 1" (2.54 cm) extruder. After air drying, the extrudates were heated slowly to 500° C. and held at that temperature for 4 hours to form catalyst extrudates. The resulting catalyst, which contained 4.14% Cu, had an average crush strength of 4.7 pounds (21 N).

Catalyst extrudates (10 mL), broken into ⅛" (3.2 mm) long pieces, were loaded into a tubular reactor and heated to 650° C. under flowing 10% N$_2$O/90% N$_2$ (3.0 L/min). The fresh catalyst decomposed 100% of the N$_2$O. The catalyst was then removed from the reactor and heated at 800° C. for 2 hours in air to simulate catalyst aging and reactor exotherms. Upon retesting at 650° C., the aged catalyst decomposed 27.0% of the N$_2$O.

Comparative Example B

Mn(NO$_3$)$_2$ solution (39.2 g, 50.9%) was mixed with zirconyl nitrate solution (60.3 g, "20% ZrO$_2$"), and water (18.9 g). This solution was added to a mixture of Zr(OH)$_4$ (average particle size 15 μ, used as received, 190.8 g) and methylcellulose (5.8 g) to form a paste. The paste was extruded into ⅛" (3.2 mm) trilobes using a Bonnot 1" (2.54 cm) extruder. After air drying, the extrudates were heated slowly to 500° C. and held at that temperature for 4 hours to form catalyst extrudates. The resulting catalyst contained 3.67% Mn and had a crush strength of 2.0 pounds (8.9 N).

Catalyst extrudates (10 mL), broken into ⅛" (3.2 mm) long pieces, were loaded into a tubular reactor and heated to 650° C. under flowing 10% N$_2$O/90% N$_2$ (3.0 L/min). The fresh catalyst decomposed 100.0% of the N$_2$O. The catalyst was then removed from the reactor and heated at 800° C. for 2 hours in air to simulate catalyst aging and reactor exotherms. Upon retesting at 650° C., the aged catalyst decomposed 69.0% of the N$_2$O.

Comparative Example C

This example shows that the method of preparation is important. Simply impregnating pre-made ZrO$_2$ with an iron salt and then calcining it to form iron-oxide-on-zirconia makes a poor catalyst.

A saturated solution of Fe(NO$_3$)$_3$.9H$_2$O was prepared. Tablets of ZrO$_2$ (Engelhard, Zr-0404, ⅛×⅛" (3.2 mm×3.2 mm)) were impregnated with the solution by mixing with an excess of solution for 1 hour and then draining the extra liquid. The tablets were dried at 93° C. The tablets were then split into two portions. The first portion was fired 4 hours at 500° C. The second portion was again soaked in a saturated iron nitrate solution, drained, dried, and fired 4 hours at 500° C. The fired catalysts had 4.66% Fe and 7.68% Fe, respectively.

Part of the first portion of tablets (10 mL) were loaded into a tubular reactor and heated to 650° C. under flowing 10% N$_2$O in N$_2$ (3.0 L/min). The catalyst decomposed 73.0% of the N$_2$O. These were not retested after aging due to their low activity before aging.

Part of the second portion of tablets (10 mL) were loaded into a tubular reactor and heated to 650° C. under flowing 10% N$_2$O in N$_2$ (3.0 L/min). The catalyst decomposed 85.0% of the N$_2$O. The catalyst was then removed from the reactor and heated at 800° C. for 2 hours in air to simulate catalyst aging and reactor exotherms. Upon retesting at 650° C., the aged catalyst decomposed 65.9% of the N$_2$O.

Comparative Example D

This example shows that Fe can be replaced with another metal and still make a strong extrudate, but the activity and robustness of the catalyst are poor.

Cr(NO$_3$)$_3$.9H$_2$O (49.8 g) was dissolved in zirconyl nitrate solution (68.7 g, "20% ZrO$_2$") and water (18.4 g). This solution was added to a mixture of Zr(OH)$_4$ (254.4 g, 15 μ average particle size, used as received) and methylcellulose (7.6 g) to form a paste. The paste was extruded into ⅛" (3.2 mm) trilobes using a Bonnot 1" (2.54 cm) extruder. After air drying, the extrudates were ramped slowly to 500° C. and held at that temperature for 4 hours. The resulting catalyst contained 3.00% Cr and had a crush strength of 15.9 pounds (70.5 newtons).

Catalyst extrudates (10 mL), broken into ⅛" (3.2 mm) long pieces, were loaded into a tubular reactor and heated to 650° C. under flowing 10% N$_2$O in N$_2$ (3.0 L/min). The fresh catalyst decomposed 70.5% of the $N_2O$. The catalyst was then removed from the reactor and heated at 800° C. for 2 hours in air to simulate catalyst aging and reactor exotherms. Upon retesting at 650° C., the aged catalyst decomposed 29.4% of the $N_2O$.

What is claimed is:

1. A process for the decomposition of nitrous oxide into nitrogen and oxygen comprising the steps of:
   (a) forming a catalyst according to the following steps:
      (i) preparing a paste by contacting zirconium hydroxide with a solution of an iron salt and a zirconium salt;
      (ii) forming a shaped particle from the step (i) paste;
      (iii) drying the step (ii) shaped particle;
      (iv) calcining the dried step (iii) shaped particle at a temperature of at least 400° C.;
      wherein at least one metal compound selected from the group consisting of cobalt, nickel, rhodium, palladium, iridium, platinum, manganese, lanthanum, and cerium, is added either to the paste formed in step (i) or to the calcined particle of step (iv);
      wherein the crush strength of the calcined shaped particle of step (iv) is at least 22 newtons; and
   (b) contacting nitrous oxide with said catalyst from step (a)(iv) under conditions effective to decompose the nitrous oxide to nitrogen and oxygen.

2. The process of claim 1 wherein said metals in the catalyst formed in step (a), excluding the iron salt, are present in an amount of from about 0.1 to about 10 weight percent.

3. The process of claim 1 wherein the metal compound added in step (a)(iv) is selected from the group consisting of cobalt, nickel, and mixtures thereof.

4. The process of claim 1 wherein the iron salt is in the +2 or +3 oxidation states.

5. The process of claim 4 wherein the iron salt is in the +3 oxidation state.

6. The process of claim 1 wherein in step (a) (iv) the dried shaped particles are calcined in air or in an inert gas.

7. The process of claim 6 wherein the inert gas is selected from the consisting of nitrogen, argon and mixtures thereof.

8. The process of claim 1 wherein particles are calcined at a temperature of from about 400° C. to about 650° C.

9. The process of claim 1 wherein said zirconium hydroxide is doped with an element selected from the group consisting of Ca, Mg, Si, Ce and La.

10. The process of claim 1 wherein 0.2%–2% of S, as sulfate, is added at step (a)(i).

11. The process of claim 1 wherein 0.2%–2% of P, as phosphate, is added at step (a)(i).

12. The process of claim 1 wherein the nitrous oxide that is decomposed in step (b) is produced as a by-product during adipic acid manufacture.

13. A process for the decomposition of nitrous oxide into nitrogen and oxygen comprising the steps of:
   (a) forming a catalyst according to the following steps:
      (i) preparing a paste by contacting zirconium hydroxide with a solution of an iron salt and a zirconium salt;
      (ii) forming a shaped particle from the step (i) paste;
      (iii) drying the step (ii) shaped particle;
      (iv) calcining the dried step (iii) shaped particle at a temperate of at least 400° C.,
      wherein the crush strength of the calcined step (iv) shaped particle is at least 22 newtons;
   (b) contacting nitrous oxide with said catalyst from step (a)(iv) under conditions effective to decompose the nitrous oxide to nitrogen and oxygen.

14. The process of claim 13 wherein the iron salt is in the +2 or +3 oxidation states.

15. The process of claim 14 wherein the iron salt is in the +3 oxidation state.

16. The process of claim 13 wherein in step (a)(iv) the dried formed particles are calcined in air or in an inert gas.

17. The process of claim 16 wherein the inert gas is selected from the group consisting of nitrogen, argon, and mixtures thereof.

18. The process of claim 13 wherein particles are calcined at a temperature of from about 400° C. to about 650° C.

19. The process of claim 13 wherein said zirconium hydroxide is doped with in element selected from the group consisting of Ca, Mg, Si, Ce, and La.

20. The process of claim 13 wherein 0.2%–2% of S, as sulfate, is added at step (a)(i).

21. The process of claim 13 wherein 0.2%–2% of P, as phosphate, is added at step (a)(i).

22. The process of claim 13 where the nitrous oxide that is decomposed is produced as a by-product during adipic acid manufacture.

23. The process of claim 1 or claim 13 conducted in the presence of additives selected from the group consisting of binders, lubricants, and mixtures thereof.

* * * * *